Dec. 15, 1925.

C. VIGNOS 1,565,831

CABLE SPLICE

Filed May 14, 1923

Inventor

C. Vignos

By

Lacey & Lacey, Attorneys

Patented Dec. 15, 1925.

1,565,831

UNITED STATES PATENT OFFICE.

CHARLES VIGNOS, OF CANTON, OHIO, ASSIGNOR TO THE AMERICAN MINE DOOR CO., OF CANTON, OHIO, A CORPORATION OF OHIO.

CABLE SPLICE.

Application filed May 14, 1923. Serial No. 638,848.

*To all whom it may concern:*

Be it known that I, CHARLES VIGNOS, a citizen of the United States, residing at Canton, in the county of Stark and State of Ohio, have invented certain new and useful Improvements in Cable Splices, of which the following is a specification.

My invention relates to devices for splicing cables and has for its object the provision of means whereby accidental opening of the splice after its application to a cable will be prevented. Another object of the invention is to provide a splice which will effectually grip the cable strands so that they will be prevented from pulling endwise from the splice. Other incidental objects will appear in the course of the following description.

The invention is illustrated in the accompanying drawing, in which—

Figure 2:
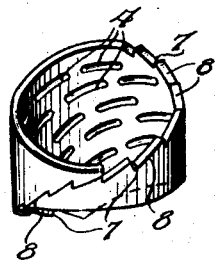
Fig. 2 is a perspective view of the completed splice.

Splices of the type forming my invention are used in large numbers to splice insulated cables and are furnished in partly closed form to be engaged around the overlapped or interwoven ends of the cable strands and subsequently compressed about the strands. In the accompanying drawing, the cable strands are indicated at 1 and the insulation is indicated at 2, the splice being applied about the ends of the strands between the ends of the insulation and then subsequently covered with insulation so that the cable may be used as a conductor without any leakage of current or short circuiting being apt to occur. In carrying out my present invention, I produce a blank, shown at 3, from a strip of flat metal by shearing through the strip at regular intervals upon lines oblique to the width of the strip. The stock is provided in one side with longitudinal parallel series of depressions 4 which are relatively narrow and elongated, the surface between the depressions being all in one plane. The side edges 5 of the stock become the side edges of the blank or splice and the cut inclined edges 6 of the blank form the end edges of the splice. In these end edges, I provide shoulders or teeth 7 extending substantially at right angles to the general line of the edge, and these teeth or shoulders 7 are connected by obliquely disposed edge surfaces 8, the said edges 8 at the opposite ends of the blank or splice being disposed reversely relative to each other and with respect to the teeth or shoulders 7 so that, when the blank is rolled upon itself, as shown in Fig. 2, the edges will ride upon each other and the teeth will be brought into engagement so as to prevent reverse or opening or expanding movement of the splice.

Figure 1:
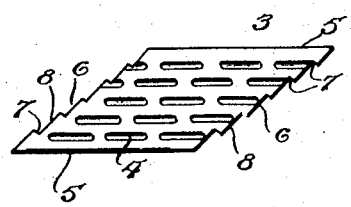
Figure 1 is a plan view of the blank from which the splice is produced.
Figure 3:
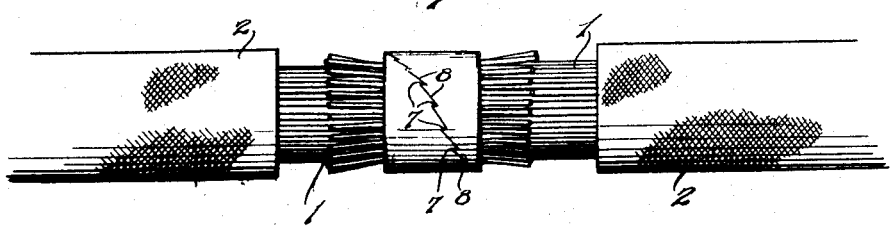
Fig. 3 is a plan view showing the splice applied to a cable.

As shown clearly in Fig. 1, the splice blank is of a general diamond shape but this particular contour may be varied as long as there are provided opposed edges which are adapted to ride upon and past each other and lockingly engage so as to hold the splice firmly about the cable. In assembling the splice with the cable, the partly rolled splice is placed about the strands at the end of one section of the cable and the ends of the strands of the two sections are then overlapped and interlaced, after which the splice is slid endwise so as to encircle the overlapped strands. Pressure is then applied to the splice by any convenient or suitable tool or by hammering so that the ends thereof will ride past each other and the opposed inclined edges will engage, as shown in Figs. 2 and 3. The splice is formed of thin sheet metal and is preferably non-elastic or non-resilient so that it will retain the shape given it under pressure. The ends of the splice are forced past each other sufficiently to cause the splice to bind tightly about the cable strands and the opposed shoulders 7 will be thereby caused to abut so that any tendency of the splice to expand or reopen under the resisting pressure exerted by the strands will be effectually overcome. When the splice has been thus caused to bind closely about the cable strands, the depressions 4 in the inner surface of the splice will permit the formation of slight kinks or bends in the several strands which will enter the depressions and thereby positively prevent endwise movement of the splice along the strands so that the sections of the cable will be very effectually prevented from pulling apart, it being understood that the said depressions extend circumferentially of the splice and, therefore, are disposed transversely to the cable strands. The device is exceedingly simple and may be produced and applied at a cost not appreciably greater than the splices now most generally used.

Having thus described the invention, what is claimed as new is:

A cable splicing sleeve of bendable metal having relatively inclined opposed side edges adapted to ride upon and past each other circumferentially of the sleeve in the act of compression, said edges each having stop shoulders formed therein at right angles thereto and inclined surfaces connecting said stop shoulders whereby the opposed shoulders are adapted to abut and prevent expansion of the sleeve.

In testimony whereof I affix my signature.

CHARLES VIGNOS. [L. S.]